(12) United States Patent
Hofman et al.

(10) Patent No.: US 8,577,088 B2
(45) Date of Patent: Nov. 5, 2013

(54) METHOD AND SYSTEM FOR COLLECTING INFORMATION RELATING TO IDENTITY PARAMETERS OF A VEHICLE

(75) Inventors: Yoram Hofman, Kefar Bialik (IL); Shai Levy, Yuvalim (IL); Shay Weissman, Haifa (IL)

(73) Assignee: Hi-Tech Solutions Ltd., Yokneam (IL)

( * ) Notice: Subject to any disclaimer, the term of this patent is extended or adjusted under 35 U.S.C. 154(b) by 0 days.

(21) Appl. No.: 13/814,221

(22) PCT Filed: Aug. 4, 2011

(86) PCT No.: PCT/IL2011/000634
§ 371 (c)(1),
(2), (4) Date: Feb. 4, 2013

(87) PCT Pub. No.: WO2012/017436
PCT Pub. Date: Feb. 9, 2012

(65) Prior Publication Data
US 2013/0136310 A1   May 30, 2013

Related U.S. Application Data

(60) Provisional application No. 61/371,015, filed on Aug. 5, 2010.

(51) Int. Cl.
*G06K 9/68* (2006.01)

(52) U.S. Cl.
USPC ............................ 382/105; 382/104; 382/217

(58) Field of Classification Search
USPC .......... 382/104, 105, 209, 217, 218; 340/933, 340/937
See application file for complete search history.

(56) References Cited

U.S. PATENT DOCUMENTS

| | | | | |
|---|---|---|---|---|
| 5,568,406 | A * | 10/1996 | Gerber | 702/159 |
| 2005/0267657 | A1* | 12/2005 | Devdhar | 701/35 |
| 2005/0270178 | A1 | 12/2005 | Ioli | |
| 2006/0030985 | A1* | 2/2006 | Lawida et al. | 701/35 |
| 2006/0278705 | A1* | 12/2006 | Hedley et al. | 235/384 |
| 2008/0285804 | A1 | 11/2008 | Sefton | |
| 2009/0208059 | A1 | 8/2009 | Geva et al. | |

* cited by examiner

*Primary Examiner* — Jon Chang
(74) *Attorney, Agent, or Firm* — Lowenstein Sandler LLP; Ariel Reinitz

(57) ABSTRACT

The present invention discloses methods and systems for collecting information relating to identity parameters of a vehicle. According to the invention an image of the vehicle is obtained. A sub-image within the image is identified, interest points within the sub-image are detected and the sub-image is processed so as to obtain descriptors representing the interest points. The descriptors are matched to predetermined descriptors representing interest points in previously obtained images respective of known identity parameters and the information is stored in a record representing an identity of the vehicle.

20 Claims, 13 Drawing Sheets

METHOD AND SYSTEM FOR COLLECTING INFORMATION RELATING TO IDENTITY PARAMETERS OF A VEHICLE

CROSS-REFERENCE TO RELATED APPLICATIONS

The present application is a US National Stage application of International Application No. PCT/IL2011/000634, filed Aug. 4, 2011, which claims the benefit of U.S. patent application Ser. No. 61/371,015 filed on Aug. 5, 2010, each of which is hereby incorporated by reference in its respective entirety.

FIELD OF THE INVENTION

The invention relates to image processing. More specifically, it relates to vehicle identity recognition (VIR) using image processing.

BACKGROUND OF THE INVENTION

Vehicle identification is required today in several applications, such as toll roads, parking lots, electronic surveillance including, e.g., security and law enforcement applications, etc. Presently, conventional vehicle identification is based on the reading of registration strings on vehicle license plates. There are known methods for License Plate Recognition (LPR), also known as Automatic Number Plate recognition (ANPR). LPR includes automatically reading a vehicle registration string off of images of a license plate captured by video cameras and/or still cameras. A registration string may include alphanumeric characters and/or other signs.

For example, U.S. Pat. No. 6,339,651 to Tian et al. describes a method and system for recognizing characters on surfaces where an alphanumeric identification code ("ID" for short) may be present such as a license plate. Tian's system is particularly adapted for situations where visual distortions can occur, and utilizes a highly robust method for recognizing the characters of an ID. Multiple character recovery schemes are applied to account for a variety of conditions to ensure high accuracy in identifying the ID. Special considerations are given to recognizing the ID as a whole and not just the individual characters.

However, PCT Patent Application Publication No. WO/2005/041071 to Lawida et al., for example, realizes that it may be possible to remove a license plate from one vehicle and attach it to another vehicle. It also possible to copy, counterfeit or spoof the license plate and attach it to other vehicles. Consequently, vehicle identification based solely on LPR is not truly vehicle identification, rather only recognition of the associated object that is intended to be used in conjunction with a vehicle. Accordingly, a need exists for an improved solution for vehicle identification. For example, in addition to license plate recognition, it may be desirable to recognize additional parameters which identify the vehicle, such as make and model, special vehicle types such as handicapped, and other attributes.

US Patent Application Publication No. 2005/0270178 to Ioli, describes a system for parking enforcement that allows vehicles to be identified and tracked without operator involvement. The system includes a meter system that generates image data of a vehicle by creating an array of pixel data in a predetermined field of view that includes a vehicle identification tag and facial imaging. An enforcement and tracking system receives the image data and generates a vehicle license number, a vehicle tag identification number and a facial image from the image data, such as by analyzing the image data to identify the vehicle license number, vehicle tag identification number and facial image based on the expected location of the license tag, identification tag and field of view image data characteristics of the license tag, facial image or other suitable data. From the image data acquired, monitoring of parking spaces is performed and violation citations or notices are generated for errant vehicles in parking locations as well as notification to law enforcement and homeland security agencies of vehicles and facial images identified as being on a watch list.

US Patent Application Publication No. 2008/0285804 to Sefton, describes a system for identifying the state of issuance of a license plate. The system analyzes various design characteristics of a vehicle license plate, including character size, placement and color, to identify the state of issuance of the plate. In some embodiments, the system uses spectral properties of light reflected from a vehicle license plate to determine spectral frequency bands having the best contrast between characters on the plate and the background of the plate. For example, red characters against a white background exhibit high contrast levels at wavelengths of about 420 nm to about 595 nm. Green characters against a white background exhibit high contrast levels at wavelengths of about 600 nm to about 750 nm. Blue characters against a white background exhibit high contrast levels at wavelengths of about 550 nm to about 750 nm. Thus, spectral characteristics in combination with other design-related characteristics of a license plate may be used to identify the state of origin of the plate. Once the state of origin is identified, origin-specific syntax matching may be used to enhance optical character recognition routines.

Referring again to the Lawida application, Lawida references a method for vehicle recognition using a plurality of metrics from one or more vehicle sensor(s). Lawida suggests creating a multimetric vehicle identification profile comprising at least two metrics and matching the obtained multimetric profile against a plurality of stored vehicle sensor recordings. However, Lawida does not teach how to process data obtained from the vehicle sensors and therefore the Lawida's referenced method remains unknown and cannot be implemented.

Several publications describe image recognition systems pertaining to finding correspondences between two images of the same scene or object. The article "SURF: Speeded Up Robust Features", by Bay H., Tuytelaars T., and Van Gool L. (ECCV 2006), describes detecting 'interest points' at distinctive locations in the image, such as corners, blobs, and T-junctions. "Interest points" are also known as "key-points" or "feature points". The neighbourhood of every interest point is represented by a vector named "descriptor vector". Then, the descriptor vectors are matched between different images. Detecting the interest points is done by a module named "detector", while representing the interest point's neighbourhood by a feature vector is performed by a "descriptor".

The following articles describe other existing interest points detectors and descriptors:

Harris, C., Stephens, M.: A combined corner and edge detector; Proceedings of the Alvey Vision Conference. (1988) 147-151. The methods described in this article are hereinafter referred to as the "Harris corner detector".

Mikolajczyk, K., Schmid, C.: Indexing based on scale invariant interest points. In: ICCV. Volume 1. (2001) 525-531. The methods described in this article are hereinafter referred to as "Modified Harris methods".

Lowe, D.: Object recognition from local scale-invariant features. In: ICCV. (1999). The methods described in this article are hereinafter referred to as "SIFT", for Scale Invariant Feature Transform.

Further to discussing interest points, attention is drawn now to image processing, wherein a color histogram is a representation of the distribution of colors in an image. For digital images, a color histogram represents the number of pixels that have colors in each of a fixed list of color ranges that span the image's color space, or the set of all possible colors. That is, while considering images of an object, it can be appreciated that the object can be modeled using color histograms.

Color histograms can be built from images in various color spaces, whether RGB, RG chromaticity, HSV or any other color space of any dimension. Basically, a histogram of an image is produced first by discretization of the colors in the image into a number of bins, and counting the number of image pixels in each bin.

F. Mindru, T. Tuytelaars, L. Van Gool and T. Moons provide a paper entitled "Moment invariants for recognition under changing viewpoint and illumination", (Computer Vision and Image Understanding, 94(1-3):3-27, 2004). In this paper they teach that when objects are viewed under different angles and different lighting conditions, their image displays photometric and geometric changes. This means that the image colors are different, and geometric deformations like scaling, rotation, and skewing have to be taken into account. A variety of approaches exist to the problem of identifying the presence of the same object under such photometric and/or geometric changes. One way of proceeding is to estimate the transformations and compensate for their effects. An alternative is deriving invariant features, that is deriving features that do not change under a given set of transformations. The main advantage of using invariants is that they eliminate expensive parameter estimation steps like camera and light source calibration or color constancy algorithms, as well as the need for normalization steps against the transformations involved.

In the article "Color indexing", Michel Swain and Dana Ballard (International Journal of Computer Vision, 7(1), 1991) use color histograms of model objects. They explain that the image colors that are transformed to a common discrete color are usefully thought of as being in the same 3D histogram bin centered at that color. Histograms are invariant to translation and rotation about the viewing axis, and change only slowly under change of angle of view, change in scale, and occlusion.

Those versed in the art would appreciate that different histograms exist. Some examples are RGB histogram, opponent histogram, hue histogram and RG histogram.

In the HSV color space, it is known that the hue becomes unstable around the grey axis. To this end, J. van de Weijer, T. Gevers, and A. Bagdanov, in their article "Boosting color saliency in image feature detection" (IEEE Trans. Pattern Analysis and Machine Intell., 28(1):150-156, 2006.) relating to hue histograms, discuss salient feature detection, whose aim is to find distinctive local events in images. Salient features are generally determined from the local differential structure of images. They focus on the shape-saliency of the local neighborhood. The majority of these detectors are luminance-based, which has the disadvantage that the distinctiveness of the local color information is completely ignored in determining salient image features. To fully exploit the possibilities of salient point detection in color images, color distinctiveness should be taken into account in addition to shape distinctiveness.

Each of the above cited references are herein expressly incorporated by reference in their respective entireties.

There is a need in the art, thus, for a mechanism for collecting information relating to identity parameters of a vehicle.

SUMMARY OF THE INVENTION

It is therefore an object of the invention to provide methods and systems for collecting information relating to identity parameters of a vehicle.

The present invention provides a method for collecting information relating to identity parameters of a vehicle, the method comprising:

obtaining an image of the vehicle;

identifying a sub-image within said image;

detecting interest points within said sub-image;

processing said sub-image so as to obtain descriptors representing the interest points;

matching the descriptors to predetermined descriptors representing interest points in previously obtained images respective of known identity parameters; and storing said information in a record representing an identity of the vehicle.

According to one aspect, obtaining an image comprises acquiring the image.

According to one aspect, identifying the sub-image includes identifying a Region of Interest (ROI) within the image where an identity parameter requiring identification appears.

According to yet another aspect, the sub-image comprises the image;

Furthermore, according to one aspect the sub-image comprises a partial area of the image.

According to yet another aspect the identity parameters of the vehicle include one or more of body color, vehicle make, vehicle model, lights shape, license plate characteristics and stickers.

The invention further provides a method for collecting license plate information respective of a license plate of a vehicle, the method comprising:

obtaining at least one image of the license plate;

analyzing said at least one image to obtain a registration string appearing on said license plate;

recognizing non-alphanumeric data marked on said license plate; and identifying colors used for marking data on said license plate and for background of said license plate, said colors forming part of the license plate information.

According to one aspect, obtaining at least one image comprises acquiring the at least one image.

Furthermore, according to an aspect, recognizing non-alphanumeric data includes identifying sub-images of said at least one image based on identifying a Region of Interest (ROI) within the at least one image where the non-alphanumeric data appears.

According to an additional aspect the sub-image comprises the entire image;

According to a further aspect the sub-image comprises a partial area of the image.

Furthermore, the present invention provides a system for collecting information relating to identity parameters of a vehicle, the system comprising:

an analyzer for analyzing an image of the vehicle for determining the information;

an image obtaining module coupled to said analyzer for obtaining the image of the vehicle and for conveying the image to the analyzer;

a storage device directly or indirectly coupled to said analyzer for obtaining the information therefrom and for storing the obtained information in a record representing an identity of the vehicle;

wherein the analyzer further comprises:

a cropping module for identifying a sub-image in said image, the sub-image includes a region of interest;

an interest points detector for detecting interest points in said sub-image;

an image processor for processing said sub-image so as to obtain descriptors representing the interest points; and a matching processor for matching the descriptors to descriptors representing interest points in another image.

According to one aspect the image obtaining module is at least one camera;

In addition, the present invention provides a system for collecting license plate information respective of a license plate of a vehicle, the system comprising:

an analyzer for analyzing said images for obtaining a registration string and graphical information appearing on said license plate;

an image obtaining module coupled to said analyzer for obtaining at least one image of the license plate and for conveying the at least one image to the analyzer;

wherein the analyzer further comprises:

a graphic recognition module for recognizing non-alphanumeric data marked on said license plate; and a colors recognition module for identifying colors used for marking data on said license plate and for background of said license plate, said colors form part of the license plate information.

The invention also provides a program storage device readable by machine, tangibly embodying a program of instructions executable by the machine to perform method for collecting information relating to identity parameters of a vehicle, the method comprising:

obtaining an image of the vehicle;

identifying a sub-image within said image;

detecting interest points within said sub-image;

processing said sub-image so as to obtain descriptors representing the interest points;

matching the descriptors to predetermined descriptors representing interest points in previously obtained images respective of known identity parameters; and storing said information in a record representing an identity of the vehicle.

Also provided is program storage device readable by machine, tangibly embodying a program of instructions executable by the machine to perform method for collecting license plate information respective of a license plate of a vehicle, the method comprising:

obtaining at least one image of the license plate;

analyzing said at least one image to obtain a registration string appearing on said license plate;

recognizing non-alphanumeric data marked on said license plate; and identifying colors used for marking data on said license plate and for background of said license plate, said colors forming part of the license plate information.

The present invention further provides a computer program product comprising a computer useable medium having computer readable program code embodied therein for collecting information relating to identity parameters of a vehicle, the computer program product comprising:

computer readable program code for causing the computer to obtain an image of the vehicle;

computer readable program code for causing the computer to identify a sub-image within said image;

computer readable program code for causing the computer to detect interest points within said sub-image;

computer readable program code for causing the computer to process said sub-image so as to obtain descriptors representing the interest points;

computer readable program code for causing the computer to match the descriptors to predetermined descriptors representing interest points in previously obtained images respective of known identity parameters; and computer readable program code for causing the computer to store said information in a record representing an identity of the vehicle.

In addition, the present invention provides a computer program product comprising a computer useable medium having computer readable program code embodied therein for collecting license plate information respective of a license plate of a vehicle, the computer program product comprising:

computer readable program code for causing the computer to obtain at least one image of the license plate;

computer readable program code for causing the computer to analyze said at least one image to obtain a registration string appearing on said license plate;

computer readable program code for causing the computer to recognize non-alphanumeric data marked on said license plate; and computer readable program code for causing the computer to identify colors used for marking data on said license plate and for background of said license plate, said colors forming part of the license plate information.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
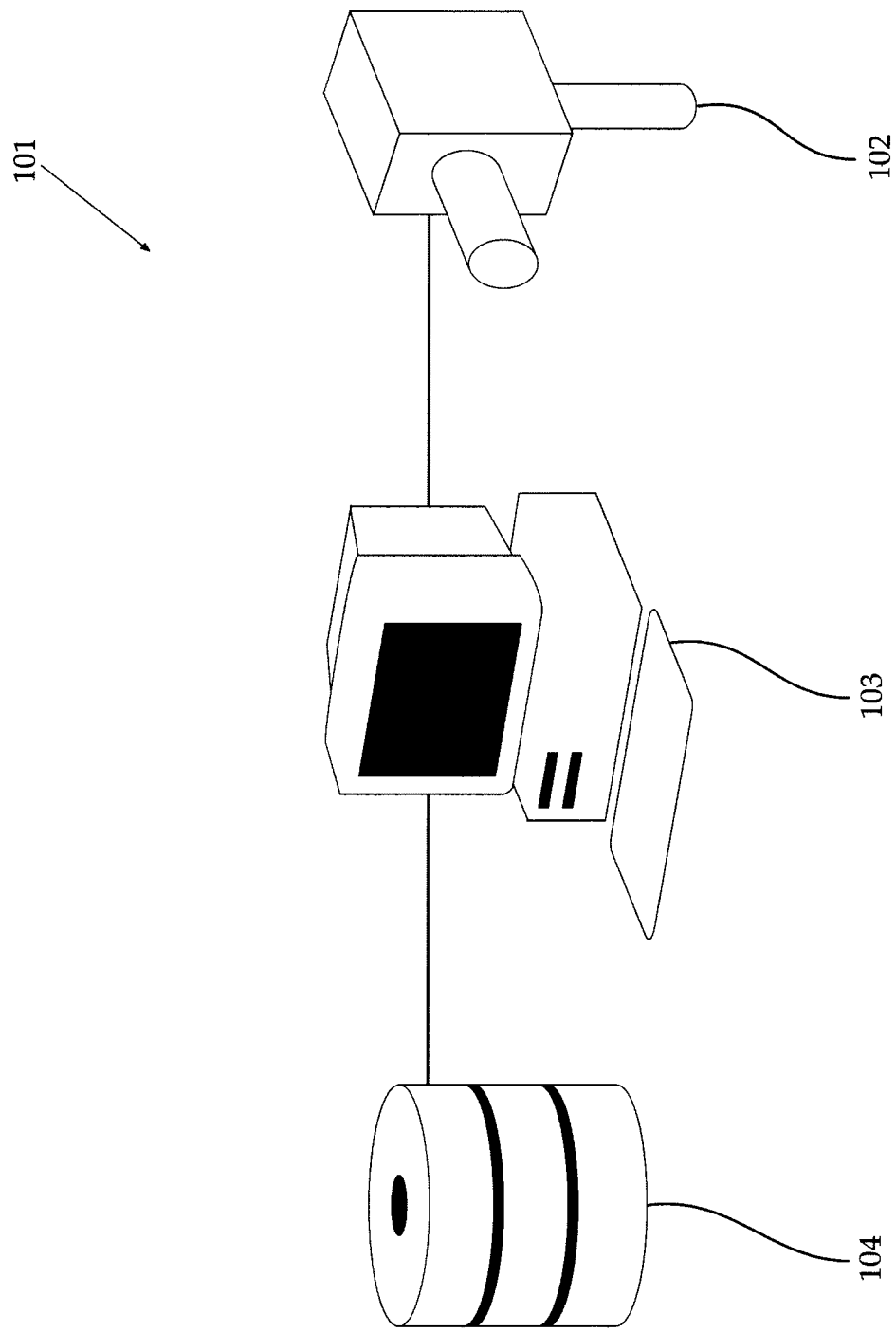
FIG. 1 schematically presents a system for recognizing vehicle identity, according to one embodiment of the invention.

In the following description components that are common to more than one figure will be referenced by the same reference numerals.

In addition, unless specifically noted, embodiments described or referenced in the present description can be additional and/or alternative to any other embodiment described or referenced therein.

It is noted here that the present description relate to vehicles, while cars are only one form of a vehicle and the invention is not limited thereto. Yet, due to readability considerations, in the description "a car" or "cars" are interchangeably used with "vehicle" or "vehicles". It should be appreciated that unless specifically noted, wherever the term "car" appears, it can be changed by "vehicle", including in expressions such as "car make" which can be replaced by "vehicle make".

Turning now to the invention, FIG. 1 schematically represents a system 101 for collecting information relating to identity parameters of a vehicle, according to one embodiment thereof. The system 101 includes at least one camera 102 coupled to an analyzer 103 and a storage device 104 that is also coupled to the analyzer.

The at least one camera 102 is used for acquiring images of vehicles, wherein it should be appreciated that the cameras may be still cameras, video cameras, infrared (IR) cameras, visible light cameras, digital cameras or any other kind of camera applicable to the case, while they may acquire black and white images, monochromatic images wherein interest points will be based on grey-level intensities, or color images. It is noted that color images may be converted to black and white or to grey scale.

For clarity the figure depicts a single camera 102, however, there may be any number of cameras, while the different cameras may be of the same kind or a combination of different types if applicable. For example, a regular-digital photoelectric video camera may be used for acquiring images during the day while an IR video camera being part of the system may acquire images during night and in deteriorated lighting conditions. According to an alternative example, a regular-digital photoelectric video camera may be used for acquiring images, while IR cameras shooting at the same time may acquire additional information that cannot be seen by the human eye.

The analyzer 103 obtains images from camera 102 and analyses them in order to determine information relating to identity parameters that may appear therein. Appreciating that a vehicle has a collection of identity parameters, such as vehicle make, the vehicle's license plate, its color, model etc., it is understood that information relating to the identity parameters, or to a subset thereof obtained at the analyzer 103 in response to analyzing the images.

It should be understood that analyzer 103 is preferably a computing device such as a personal computer. Analyzer 103 preferably includes a processor and one or more storage devices such as a memory and/or a hard disk. The storage devices are encoded with computer code comprising one or more software modules and/or applications. When executed by the processor of analyzer 103, the software modules configure the analyzer 103 to perform the various operations, steps, and functions disclosed herein.

The information obtained from the analyzer is stored in a storage device 104 that can serve for long term storage or for short term storage. Examples of long term storage devices are disks, flash memory units and others, while RAM (Random Access Memory) is an example of a short term memory device. In addition, the storage device 104 is not necessarily a single storage device, and those versed in the art would appreciate that in many cases the storage device 104 represents several memory devices, including one or more short term memory devices and/or one or more long term memory devices. The information is stored in a record representing identity of a vehicle.

At this juncture it should be understood that although analyzer 103 and storage device 104 are depicted in FIG. 1 as separate elements, in certain embodiments analyzer 103 and storage device 104 can be arranged as a single element, such as a computing device having a storage device, as referenced above.

While term "record" as used herein can refer to a data structure known in the art of computer science as record, its meaning as used herein is not so limited. Rather, the term record within the context of the present disclosure refers to any form that allows the associating together of information relating to the same vehicle, in addition to the storing of information relating to each parameter in a separate, dedicated file in the storage device, as long as the information stored therein can be later associated with the vehicle.

In the embodiment illustrated in FIG. 1 the camera 102 and the storage device 104 are directly coupled to the analyzer, while the camera 102 is indirectly coupled to the storage device, i.e., it is coupled thereto via the analyzer 103. However this is non-mandatory and non-limiting. For example, in another embodiment direct coupling may exist between the camera and the storage device, while in this same embodiment or any alternative embodiment there may exist no direct coupling between the camera and the analyzer and/or between the storage device and the analyzer.

Figure 2:
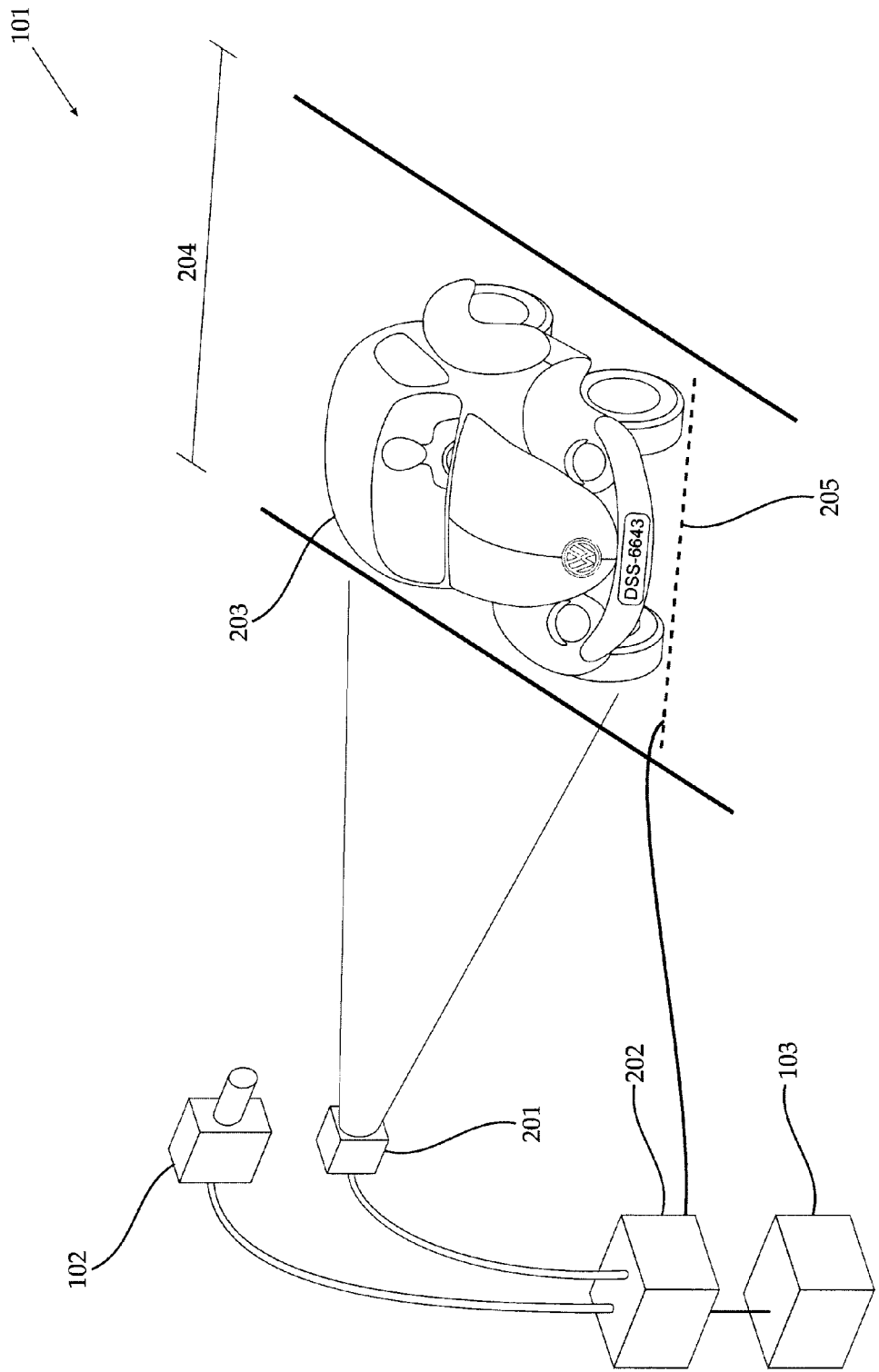
FIG. 2 is another schematic presentation of the system of FIG. 1, presenting the system in more details, according to one embodiment of the invention.

FIG. 2 is another schematic presentation of the system of FIG. 1, presenting the system in greater detail, according to one embodiment of the invention. In this figure the camera 102 is accompanied by an illumination unit 201, while both the camera and the illumination unit are coupled to a controller 202, which is coupled, in turn, to an analyzer 103. It is noted though, that in other embodiments the controller 202 and the analyzer 103 may be one, that is, in this latter example the analyzer may function also as a controller (or vice versa), and hence, instead of controller 202 the analyzer 103 would appear in the figure.

The illumination unit 201, constituting also "illumination module", is an optional unit providing illumination, e.g., for night operation. In some embodiments the existence of illumination units might be mandatory, while in such embodiments the illumination units may illuminate also during the day. Those versed in the art will appreciate that such day-illumination is negligible and effectively does not modify the captured images. Examples of illumination unit 201 include infrared and incandescent light sources such as lamps or bulbs.

In the figure a vehicle 203 is depicted, a car in this case. The car 203 travels through a lane 204. According to the embodiment, a "lane" is defined as a path passing in the system's scanning zone or as a path covered by the system's scanning zone. The scanning zone is the zone within the camera's field of view, wherein in those embodiments that include more than one camera, the scanning zone is the zone covered by the field of view of at least one of the cameras. A lane can be on a road, in a parking lot, or in any other place where cars, or more generally vehicles can be.

When a car enters the lane, it is detected by a detector 205, coupled to the controller 202. The detector 205 is a module configured for providing an indication constituting a "trigger" when the front side or rear side of the vehicle passes a certain detection line. The detector may be, for example, a hardware device (such as loop detector or laser trigger) or a software program (e.g., performing video motion detection). It provides the controller with an indication of the presence of the car in the lane, i.e., in the system's scanning zone.

The detector can detect entry of the vehicle into the scanning zone and provide an immediate indication thereabout to the controller. However, it is not mandatory to provide the indication upon entry of a vehicle into the lane and other alternatives may exist, such as detecting when the vehicle reaches a specific position in the lane or providing the indication a certain time interval after the entry of the car into the lane, etc., including even providing an indication when the car leaves the lane. Upon obtaining the indication, the controller may activate or deactivate the camera, with or without the illumination unit, as well as the analyzer 103.

Before advancing it is noted that in some embodiments of the invention the images can be obtained in advance and then conveyed to the system for processing. Hence it should be realized that in such embodiments, instead of at least one camera there will be an image obtaining module (that is, a software application that configures a processor to obtain one or more stored images). Appreciating that a camera can also be thought of as a type of "image obtaining module", wherein obtaining the images is achieved by acquiring them, it can be stated that in the general case a system according to the invention includes an image obtaining module 102.

Figure 3:
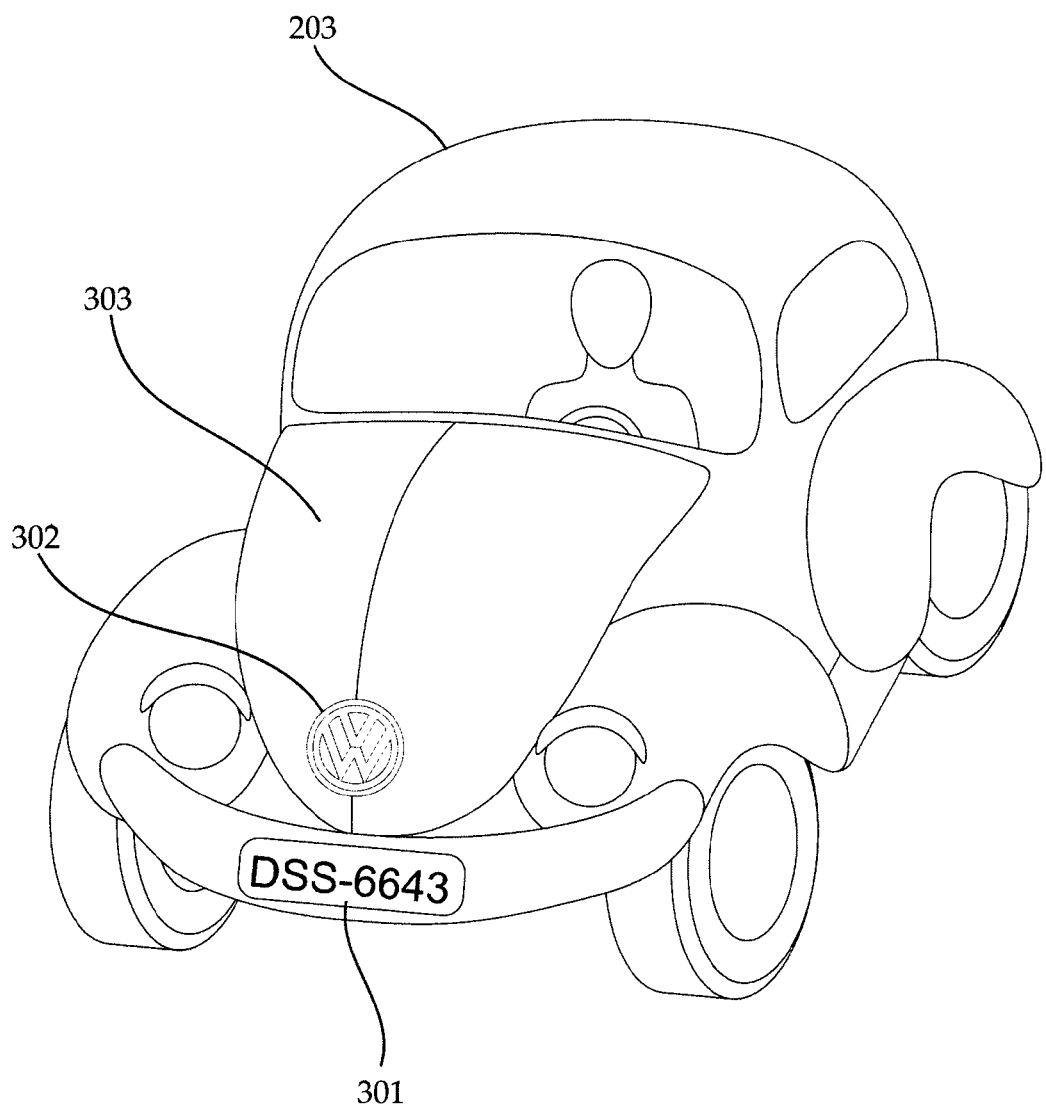
FIG. 3 illustrates a vehicle carrying identity parameters, as defined in accordance with certain embodiments of the invention.

FIG. 3 illustrates a vehicle 203 carrying identity parameters, as defined in accordance with certain embodiments of the invention. The illustrated vehicle 203, which is a car, presents a car license plate 301, a maker icon 302 and the car's color 303. It is noted that a "maker icon" constitutes also a "vehicle make icon", "car manufacturer logo icon" or simply a "make icon". Yet, other identity parameters, that do not appear in FIG. 3, may be presented by a vehicle, such as the car model, the state/country where this car is licensed, special symbols (e.g., a handicapped symbol), vehicle's body length, number of axles, body color, speed and direction and/or others.

Figure 4:
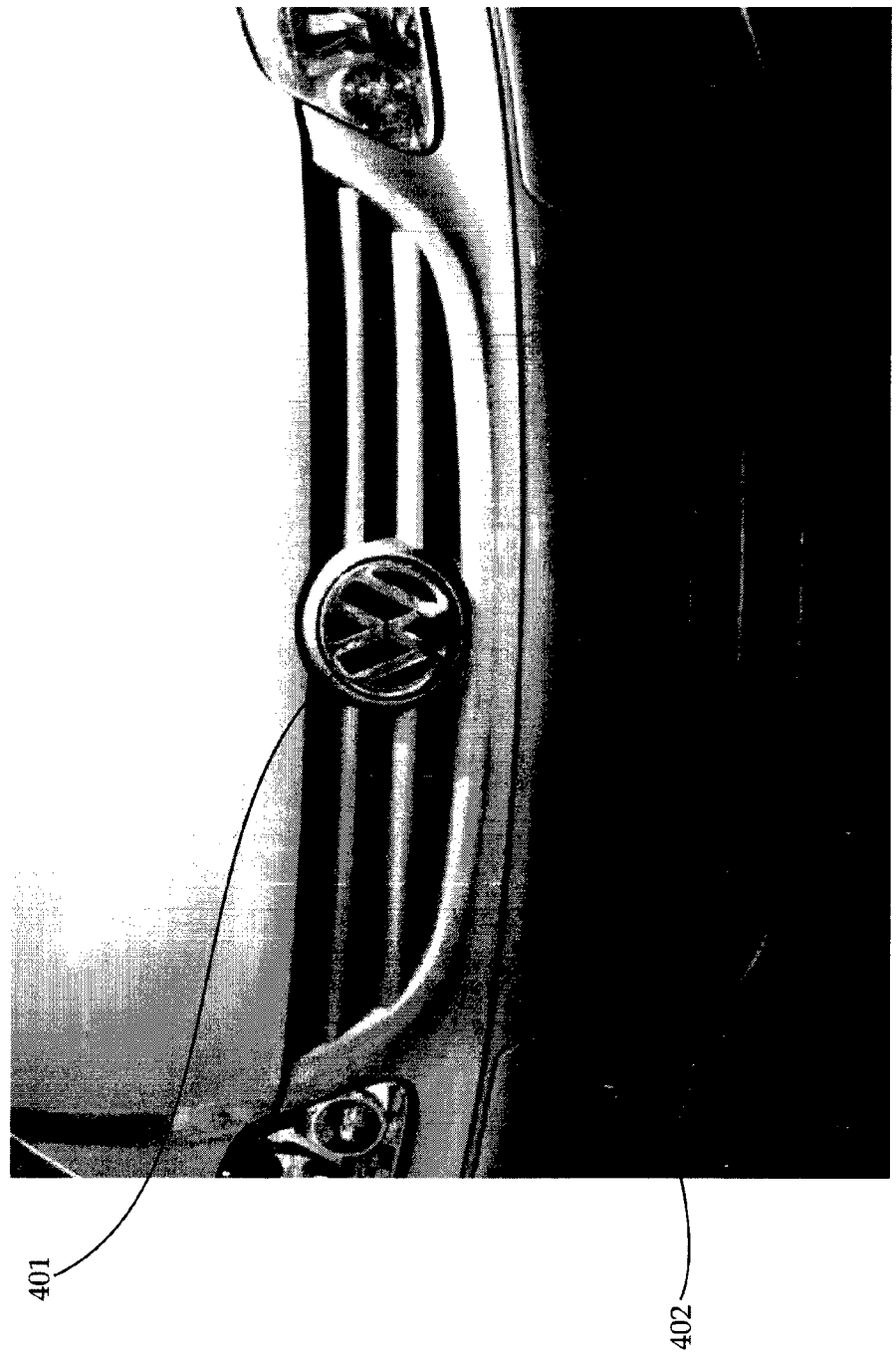
FIG. 4 is an example of a front view image of a car.

FIG. 4 is an example of a front view image of a car. A person watching this image would recognize the vehicle as a Volkswagen car, mainly based on the Volkswagen icon 401, which is located in the center of the vehicles width. The Volkswagen icon 401 is the vehicle's maker icon. In the image the car's license plate 402 can be seen as well.

Figure 5:
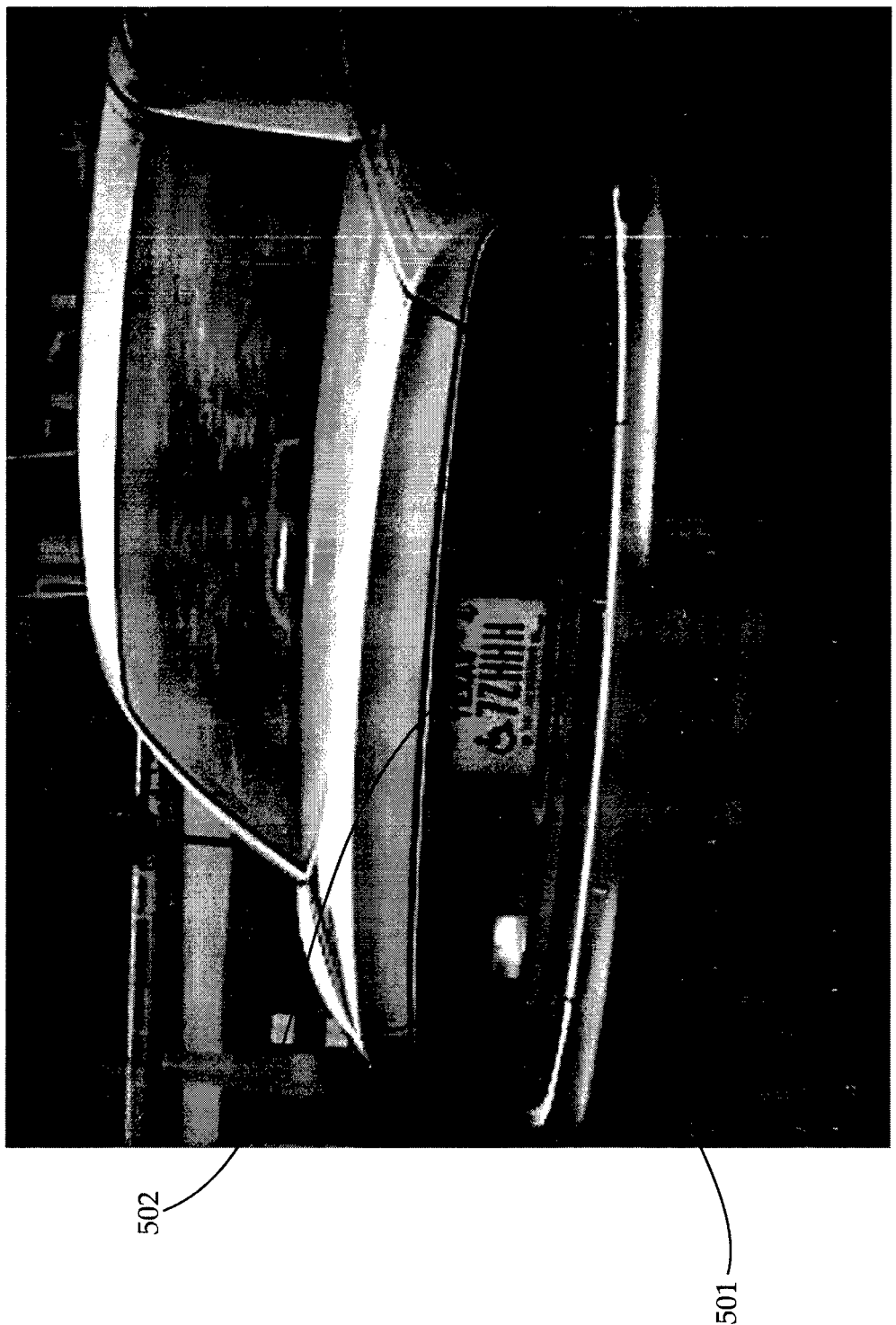
FIG. 5 is an example of a rear view image of a car.

FIG. 5 is an example of a rear view image of a car. In this case it is possible to identify that the car is a Buick based on the name plate (see 501) embedded on the vehicle, while the license plate 502 indicates that the car is registered in Texas, by a person having a disabled parking placard. The disabled parking placard is indicated by the wheelchair symbol marking on the license plate, while it should be appreciated that in other cases different symbols may be embedded on the front and/or rear license plates, such as government issued plates. Furthermore, many vehicles have symbols and/or captions printed or adhered thereto, such as company pass stickers, while these "stickers" may be used as well as part of the vehicle's identification parameters. The term "stickers" in that sense include also company logos printed, e.g., on the vehicle's body etc., that is, any mark (whether textual and/or graphical) added to the car and not being part thereof during manufacture or during the registration/licensing process.

That is, in addition to the car make, additional information relating to the identity of the car can be retrieved from the front and/or rear images or even from images taken from the side. For example, the license plate depicted in FIG. 4, which is a Brazilian license plate, provides state and city information. In Brazil, the leftmost letters on the license string describe the state where a vehicle was originally registered, while in this case DSS indicates that the car was originally registered in SP, that is, Sao Paulo. Above the license string appears the state abbreviation and the name of the municipality in which the vehicle is currently registered. In FIG. 4 it is the municipality of Sao Paulo in the state SP. However, unlike Brazil, where the state and city information are highly detailed, in other places only country/state textual identification (as seen in FIG. 5) or flag is printed on license plates, while in yet other countries state and/or city information may be completely missing.

Reading the textual information included in the license plate can be accomplished using many existing LPR (License Plate Recognition) techniques, however, a license plate may include identity information beyond the textual information embedded therein. For example, in Brazil license plates use color schemes for decoding the vehicle's usage category. In this manner, learning that the scheme in the license plate illustrated in FIG. 4 is black on white, for example, facilitates learning that the car is a government-owned car, i.e., it is in use by the police, fire department, federal agencies, for state or city public services, etc.

Turning now to the maker icon, it is appreciated that there are many different car manufacturers and most of them use maker icons that identify the vehicles that they produce. Currently, there are also unbranded manufacturers; however, their cars are normally marketed under some brand names having maker icons identified therewith. Hence, in these cases, the maker icon on the car would be that of the brand name used for the marketing thereof. Hereinafter, throughout the specification, unless specifically noted, the term "maker icon" and its synonyms as well as other identity parameters, are used equally to refer to branded and unbranded vehicles. Similarly, discussing manufacturers applies also to those marketing unbranded cars under a certain brand name.

The majority of the car manufacturers position the maker icon in the center of the vehicle, on the rear side of the car and/or sometimes also on the front side. However, there exist cars on which the maker icon is located off-center. Maker icons vary in size, shape and color. In this fashion, shapes and designs include, for example, rectangular maker icons, circular icons, elliptical icons, etc., as well as icons having complex shapes. Maker icons' internal design may include graphical symbols and letters. Icons' sizes have high variability as well. For example, there are maker icons whose size is 7×7 cm, there are icons whose size is 18×10 cm and there are plenty of other sizes as well. Turning now to color, many of the icons have a polished silver color, though this is non mandatory as well.

Figure 6:
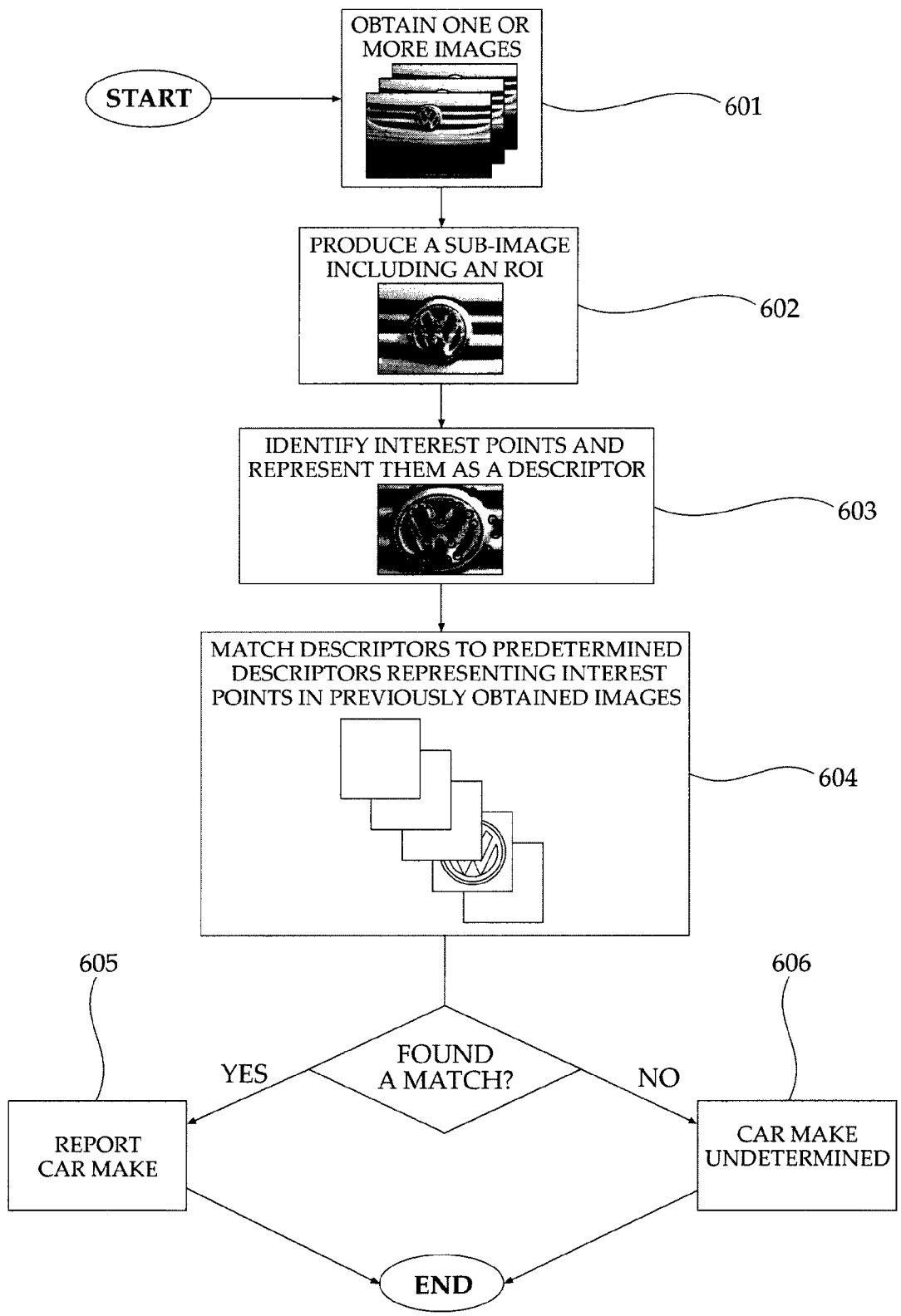
FIG. 6 presents a flowchart presenting the main procedures utilized while identifying a car maker icon of a vehicle, according to certain embodiments of the invention.

Further to seeing the examples of FIGS. 4 and 5, presenting front and rear images of vehicles, and leaning about the identity parameters illustrated thereby, FIG. 6 presents a flowchart of the main procedures utilized while identifying a car maker icon of a vehicle, according to certain embodiments of the invention. It is noted that for clarify of the description, this flowchart is based on the Volkswagen maker icon illustrated in FIG. 4, however, this is not-limiting and the flow may be suitable to any other maker icon, taken from a front or rear view of a vehicle, as well as to other identity parameters.

Upon start, one or more images of a front or rear side of a car are obtained at 601. It is possible to obtain the images directly from the camera 102, from the analyzer 103 further to performing some kind of image processing manipulation on acquired images, or it is possible to obtain previously acquired images, e.g., images stored in the storage device 104. According to embodiments of the invention it can be enough to obtain only one image at 601, however, if the number of obtained images increases, it is also possible to increase the confidence level of the maker icon identification.

It can be appreciated that run time of calculations based on image processing is a function of the image size, while calculations performed on a smaller sub-image are performed faster compared to performing them on the entire image.

Hence, at 602 the flow identifies a Region of Interest (ROI) within the image/images obtained at 601, producing an enhanced sub-image including the ROI. The ROI is an area within the image where an identity parameter requiring identification appears. In the present example, the identity parameter is a maker icon and hence the ROI is the region where the maker icon appears. If more than one image, i.e., a plurality of images are obtained at 601, the outcome of 602 according to the present embodiment would be a single enhanced image based on the plurality of images and covering the sub-image including the ROI. If, on the other hand, only a single image is obtained in 601, the outcome of 602 would be a sub-image of this single image.

In the latter embodiment it should be understood that a plurality of images obtained at 601 may form a basis for generating an enhanced image at 602, whereupon this enhanced image includes the ROI. Those versed in the art would appreciate that there are known per se methods for generating an enhanced image based on a plurality of images. For example, registration is performed on the images in the plurality and then the new enhanced image is generated as an average of the images.

It is noted though that sometimes it is impossible or difficult to define an ROI. For example, while searching for symbols within a license plate, it is often impossible to assume where the symbols would appear. Hence, in this case, the ROI is defined as the entire area of the license plate, while those versed in the art would appreciate that the entire area of the license plate is calculated from the License Plate Recognition (LPR) process. Hence, in the worst case the sub-image produced in 602 might be the entire image obtained in 601, or an enhanced image based on the plurality of images obtained in 601 and substantially reflecting the entire images being part of this plurality. In a better case the sub-image would cover a partial area of the image (or images) obtained in 601.

Returning to FIG. 6, 603 includes interest points extraction, i.e., identifying interest points relating to an identity parameter from the sub-image obtained from 602. Interest points identification is further described with reference to FIG. 7 below. Then, they (the interest points) are represented by a numerical representation constituting a "descriptor". According to the present embodiment, each descriptor represents an interest point and each interest point is represented by a descriptor.

Thereafter, at 604, the obtained descriptors are compared with predetermined descriptors representing interest points in previously obtained images respective of known identity parameters. In the present example, the descriptors representing the Volkswagen maker icon (see 603) are matched to "templates" of known maker icons, each template including descriptors representing the respective known maker icon. Thus, if the templates include a Volkswagen maker icon, the descriptors obtained in 603 can be expected to match thereto, hence a system operating in accordance with the presented embodiment will identify the maker icon appearing in the example of FIG. 4 as a Volkswagen icon.

While matching the descriptors with templates at 604, the matching strength is used for calculating a confidence measure, known also as "confidence level" of the result.

The outcome of the 604 matching is identification of the maker icon and hence also of the car make (see 605). It is appreciated that "maker icon" is an identification parameter and so is the "car make", while the icon's identification (e.g., "Volkswagen") and the car make identification are information relating to the identification parameter. Alternatively, when the comparison can find no matching, on 606 it will be declared that the car's maker icon is undetermined. It is noted though that the manufacturer's icon is only one way to determine car make of a vehicle, and sometimes the information is achievable using another identification parameter (e.g., Rolls-Royce uses a uniquely designed grille, that can be used for car make's identification).

Further to understanding the embodiment of FIG. 6, it should be noted that alternatives and/or variants may exist. According to one such variant, instead of generating an enhanced image at 602, including the ROI, it is possible to identify the ROI in each one of the images obtained at 601, generating a sub-image for each one of the obtained images. That is, at 602 of such embodiment, for each image wherein an ROI is identified, a sub-image including the ROI is generated. Furthermore, sometimes there are more than a single ROI in an image obtained in 601 (for example, an obtained image may show the license plate and the maker icon), hence at 602 there may be more than one sub-image generated.

Then, in embodiments wherein multiple (i.e. more than one) images are obtained, and an ROI is identified in each one of them, thus generating multiple sub-images, it is possible, at 603, to identify, or select interest points which are common, e.g., to more than one sub-image or to all the sub-images etc., thereby selecting the "strongest" or the highly-probable interest points. Then, at 604, only these highly-probable interest points will be used for the matching. During matching, common interest points are looked for, that is, interest points that appear in the image being the outcome of 602 ("the 602 image"), and in the template used for matching. The best match allows, then, selecting the template that best matches to the 602 image. As the best matching template represents a known identification parameter of a known manufacturer, it is possible to identify the manufacturer of vehicle to whom the 602 image belongs.

It is noted that in the example explained with reference to the flowchart of FIG. 6, at 604 the image descriptors are matched with the descriptors of images obtained in advance. This is non limiting though and a person versed in the art would appreciate that matching can be done with descriptors of any image. For example, it is possible to match two images in order to verify their identity, or in order to check that an object appearing in one of them appears also in the other.

Furthermore, such embodiments, using the existence of common interest points as a category for template selection, can also use the common interest points for calculating confidence, e.g., based on the number of repeating interest points in a single image or sub-image.

Before further advancing it is important to realize that interest points detectors, such as SURF, require a certain minimal number of interest points within an image in order to being able to process information therefrom. Hence, for example, if the imaged parameter or object is a license plate, the resolution of the image may be determined by the image processing system (for example: five pixels pre cm or higher), which determined the size of the imaged object and hence also the distance of the camera from the lane and the focal length thereof.

Figure 7:
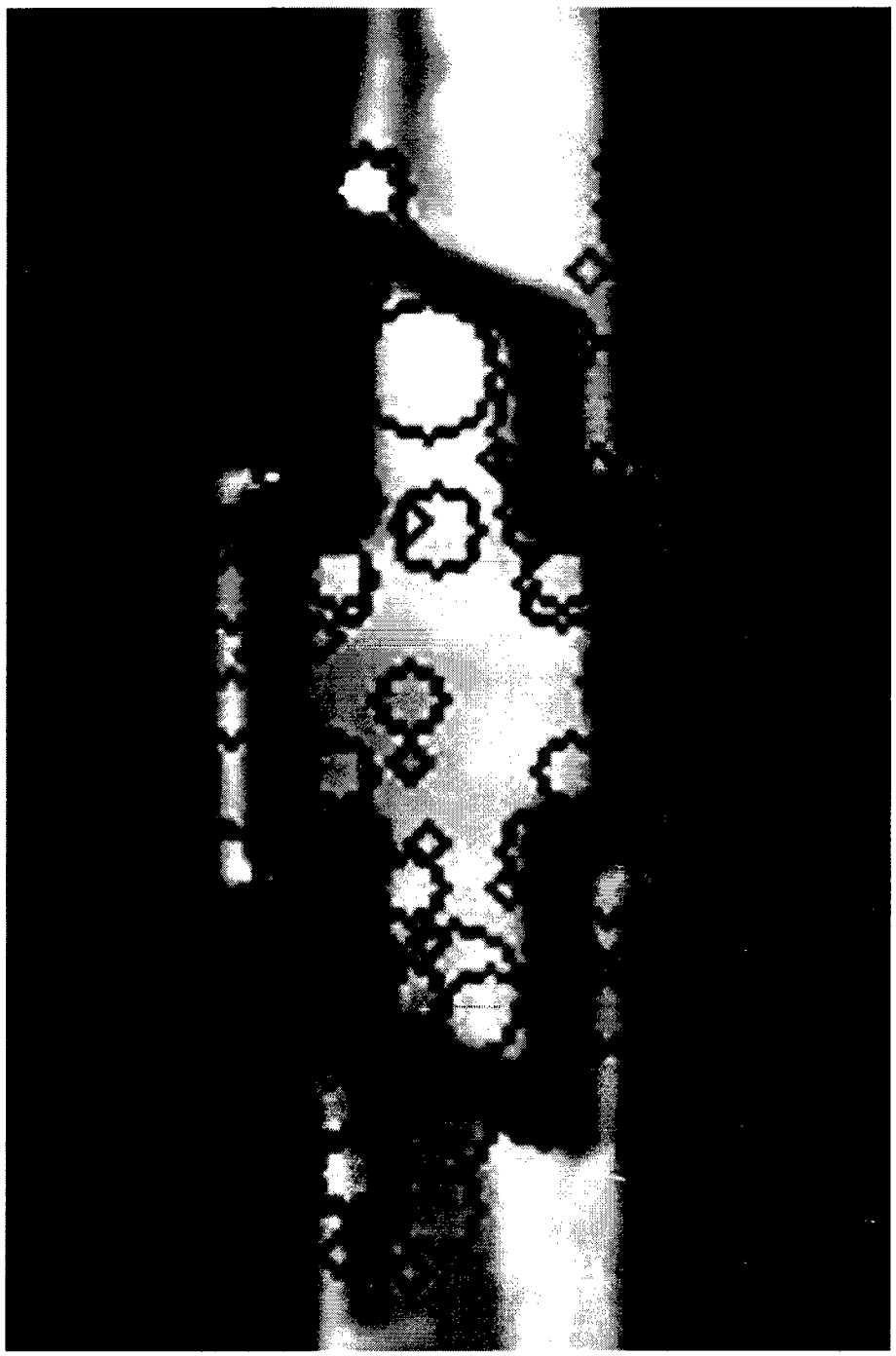
FIG. 7 illustrates interest points in an image of a Chevrolet maker icon, in accordance with an embodiment of the invention.

FIG. 7 illustrates interest points in an image of a Chevrolet maker icon, in accordance with an embodiment of the invention. The figure is an example of a sub-image, wherein the Chevrolet icon, which is the maker icon, is the region of interest (ROI). The circles in the image represent the interest points while each circle is located around a detected interest point. It can be seen that the points are located on the maker icon and in other parts of the sub-image. Many times they represent detected corners or distinctive changes in the brightness in both horizontal and vertical directions.

The SIFT descriptor proposed by Lowe in his "Distinctive image features from scale-invariant keypoints, cascade filtering approach" paper describes the local shape of a region using edge orientation histograms. The gradient of an image is shift-invariant: taking the derivative cancels out offsets. Under light intensity changes, i.e. a scaling of the intensity channel, the gradient direction and the relative gradient magnitude remain the same. Because the SIFT descriptor is normalized, the gradient magnitude changes have no effect on the final descriptor. Light color changes have no effect on the descriptor because the input image is converted to grayscale, after which the intensity scale-invariance argument applies. To compute SIFT descriptors, the version described by Lowe can be used.

It is noted thus that "interest points" are locations in the image having the following characteristics:

Their position is well defined and stable, that is: when changing capture conditions, such as changes in lighting, viewing angle or distance (size), at least by a certain predetermined level constituting "predetermined change threshold" per change, the algorithm still detects the point as an interest point.

The description of an interest point is distinctive, meaning that the descriptor of one interest point is substantially different from the descriptor of the other interest points. Yet, there is a certain low probability that two descriptors, of two different interest points in two different locations in an image or in two different images may be similar or highly resemble each other.

Template matching is based on multiple interest points, unlike of a single interest point, thus lowering the probability of false matching due to possible resemblance of two descriptors.

Further to understanding how images (and sub-images) are analyzed, and what interest points are, it is possible to turn now to explaining how a collection of templates is constructed. A system operating in accordance with the invention requires the collection of templates in order to match subimages therewith in order to identify information relating to identification parameters. The templates are predetermined descriptor vectors representing an interest point and its neighborhood.

According to certain embodiments the invention, the collection of templates is collected during a training phase (hereinafter, the "training phase embodiment"). However, this is non-limiting and in other embodiments, for example, the system may obtain a collection of templates prepared in advance, or it may gain access to a collection located remotely (e.g., via the internet) instead of having a locally stored collection. The remote collection may be dedicated to the system or it may be shared between several systems. Furthermore, in certain embodiments the collection is created during the training phase and left static, i.e, without a change, unless the system enters again into a training phase. In alternative embodiments, though, the collection may be dynamic, where it is possible, for example, to introduce new templates thereto during operation, and/or to remove existing templates.

Figure 8:
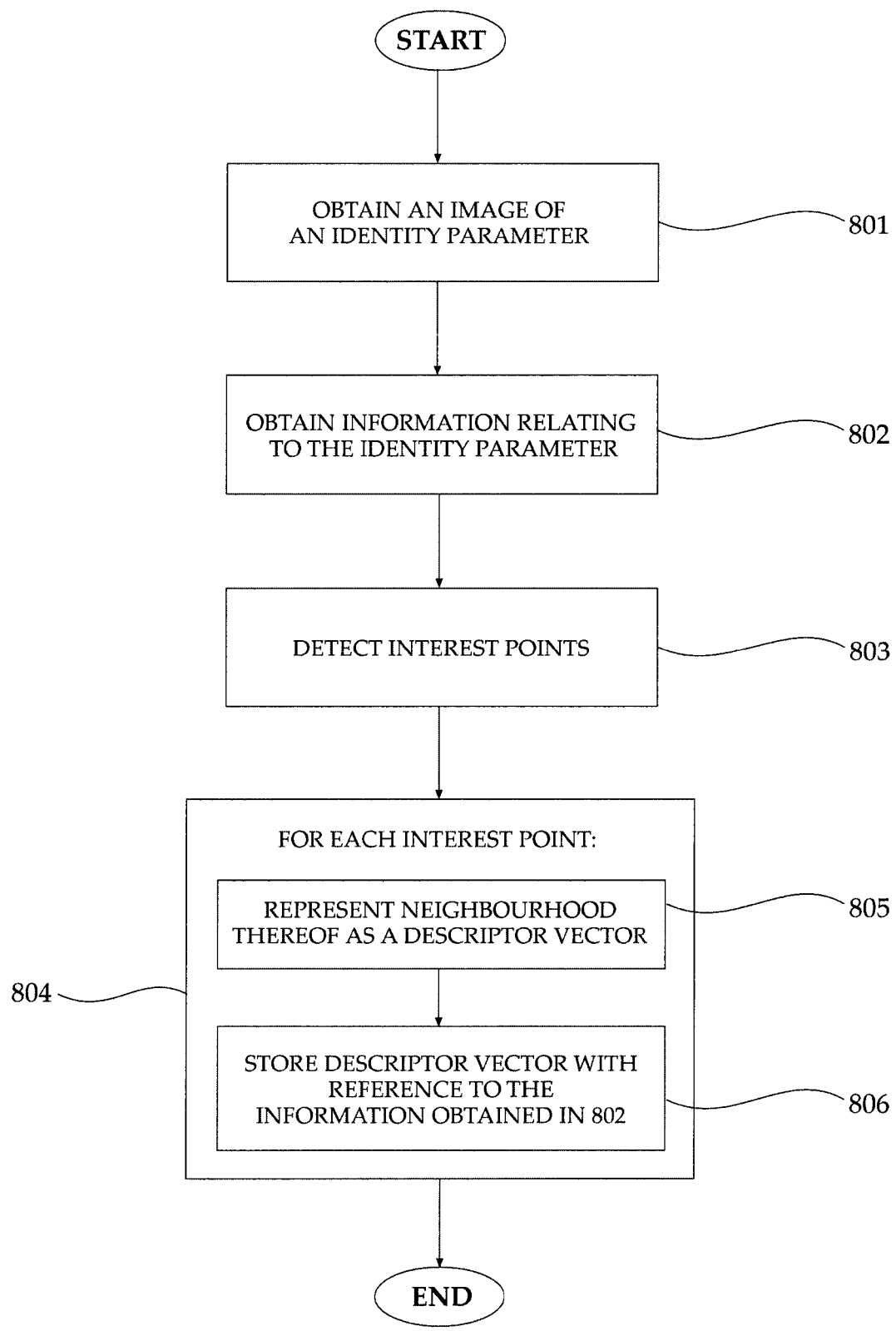
FIG. 8 is a flowchart illustrating the operations performed while updating a collection of templates, according to certain embodiments of the invention.

FIG. 8 is a flowchart illustrating the operations performed while updating a collection of templates, according to certain embodiments of the invention. Persisting with the maker icon example, at 801 an image is obtained, wherein it should be appreciated that the image includes an identification parameter (in this case it is a maker icon image). At 802 information relating to the identification parameter is provided. For example, if the image obtained in 801 depicts a Volkswagen maker icon, the information obtained in 802 can be the identification "Volkswagen". For manufacturers having more than one icon the identification can be "Volkswagen1", "Volkswagen2" etc., although this is non mandatory.

The flowchart of FIG. 8 presents "on line" processing of template images, that is: an image is fed to the system and immediately processed thereafter, before feeding the next image. Those versed in the art of computing will realize that batch processing is also possible, as well as parallel processing, wherein images are fed, while in parallel they are being processed. It is noted that in 801 images taken from different view angles and in different sizes can be provided. According to certain embodiments the images are cropped to remove unnecessary surrounding background. They can be cropped in advance, before providing them to the system, or they can be cropped by the system in any method known per se. including manually by a human operator.

At this stage several options exist: according to certain embodiments the images are stored in a storage device (i.e., a disk or any other long term memory device, with or without a database). According to other, alternative embodiments illustrated in FIG. 8, the images are further processed in order to identify interest points therein as presented at 803. Then, for each interest point (see 804), at 805 interest points are represented by numeric descriptor vectors. The descriptor vectors are then stored at 806, in e.g. in a database, to serve as templates or in other words, as numerical representations of the images in the collection of images. Having said that, it should be appreciated that yet other embodiments may exist, combining storage of the images with further processing and storage of the numerical representations.

It is explained that although the creation of the collection of templates has been described with reference to maker icons, this is non-limiting and the collection can include images and/or representation of images depicting other identity parameters, such as the vehicle's grille shape, lights shape (including head lights, and/or indicator lights, and/or tail/rear lights, etc.), maker and model icons (sometimes referred to as "emblems") and others. According to certain embodiments the collection of templates can be dedicated to a certain identity parameter, while in a system configured for identifying several different identity parameters, several collections should exist (e.g., one collection per each parameter). However, this is non-limiting as well and in alternative embodiments a collection of templates can be shared by several identity parameters. For example, it is possible to configure the system for storing maker icons' templates and car model's emblems in a single database.

Figure 9:
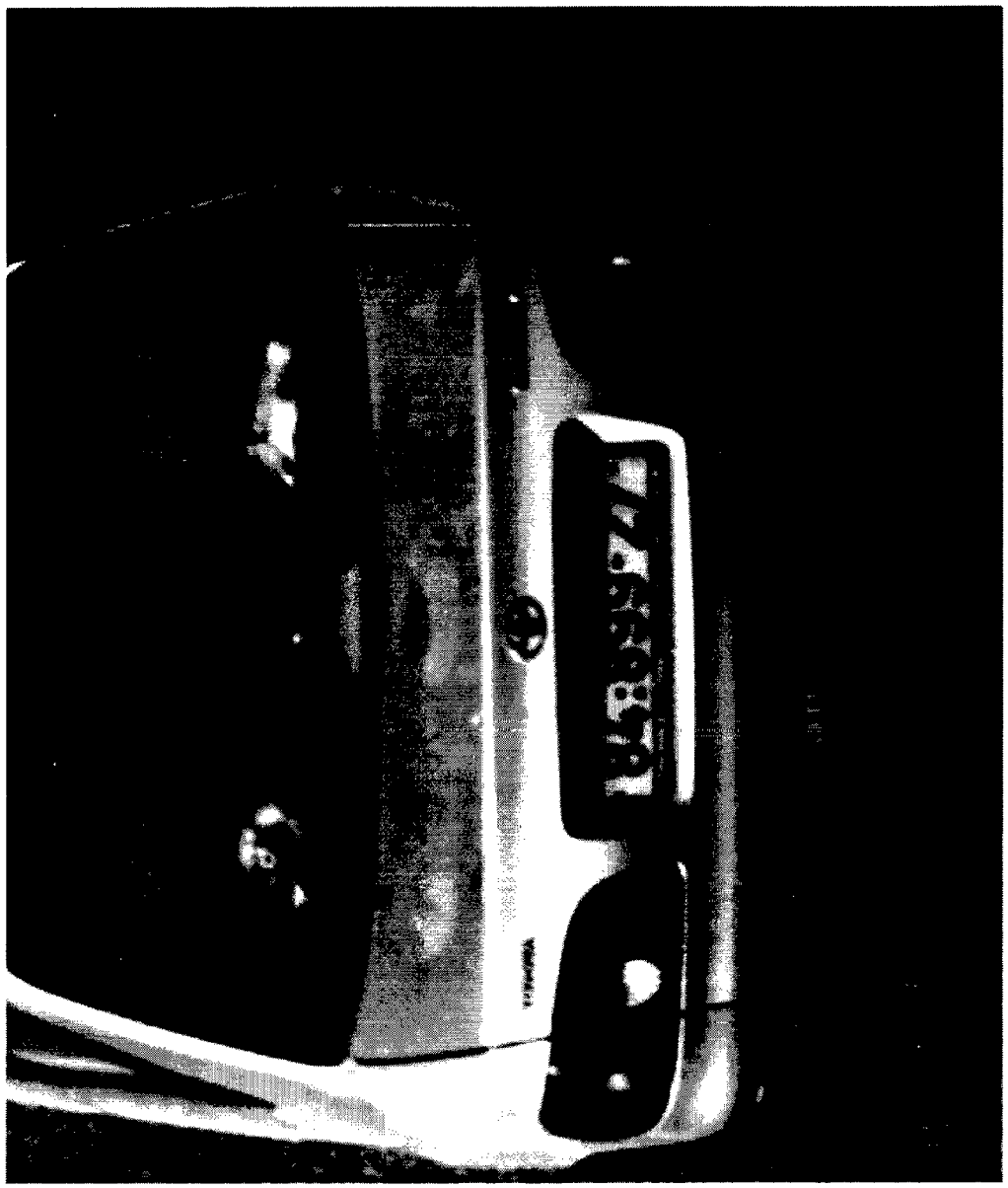
FIG. 9 is an image showing the rear side of a Toyota Corolla car.

Further to understanding how information relating to identification parameters can be collected in accordance with embodiments detecting and representing interest points, attention is drawn now to FIG. 9, presenting an image showing the rear side of a Toyota Corolla car. In the presented case, the car model string is explicitly indicated on the right side ("Corolla"), while the Car make is explicitly indicated on the left ("Toyota"), and while in the center the emblem (graphic icon, car make icon) appears. It should be considered that in some car models the car model string may be replaced by a car model icon. However, performing car model recognition by model icon can be done in a way similar to car model recognition by model string. Hence, due to simplicity considerations, the description below describes the case of car model recognition by car model string, while it should be appreciated that unless specifically stressed, identification by car model icon is covered thereby as well.

From looking at the image of FIG. 9 it is apparent that the image acquiring device is not positioned in direct parallel to the vehicle. It is also understood that if the angle of view would be too steep, distortion would appear, and at some level it might prevent the system from analyzing and collecting information relating to the vehicle. Hence, according to one embodiment of the invention, rear images are acquired within +−20 degrees around the horizontal axis.

The value of +−20 degrees around the horizontal axis presented here is an example and a person versed in the art would appreciate that the angle can be of any range allowing reading and identifying the objects seen in the image. Likewise, in the presence of image processing algorithms that can enhance the image and reduce distortion thereof, other, wider angles will be covered by the present invention as well.

Hence, if an image within a proper angle can be acquired to present the rear side of a vehicle, it might be tempting to identify the vehicle model based on identification of the model's string or icon. However, this task is not as simple as it sounds. Assuming that there are 700 different car models around (in reality there are likely more), and for every model there are several configurations or sub-models (such as 4 or 5 door), in addition to the look and design of the vehicles that may change from one year to another, the number of permutations may reach thousands. Remembering further that systems operating in accordance with the invention may be required to operate in almost real-time, e.g., security systems, it becomes difficult to stand the demand.

Therefore, according to certain embodiments of the invention, processing is divided into two stages. The first stage classifies the car make, which limits the feasible car models that can describe the tested vehicle. Hence, in the example presented in FIG. 9, the car is first identified as a Toyota. Then, in the second stage it is identified as a Corolla.

In addition, the required accuracy of the identification affects the complexity of the processing. For example, in a lower-accuracy system, processing can be based on icon and model text alone. However, whereupon the required accuracy rises, it might be needed to detect two (and possibly more) different objects or identification parameters, such as model string, rear window shield form, and tail lights form. In addition, required accuracy may force usage of certain elements in the system, such as strong and fast illumination units 201 (see FIG. 2), an extra-sensitive camera and/or a wide dynamic range camera. Another solution may be acquiring front and rear images of the vehicles, instead of relying on rear-only images (or front-only images etc.).

Figure 10:
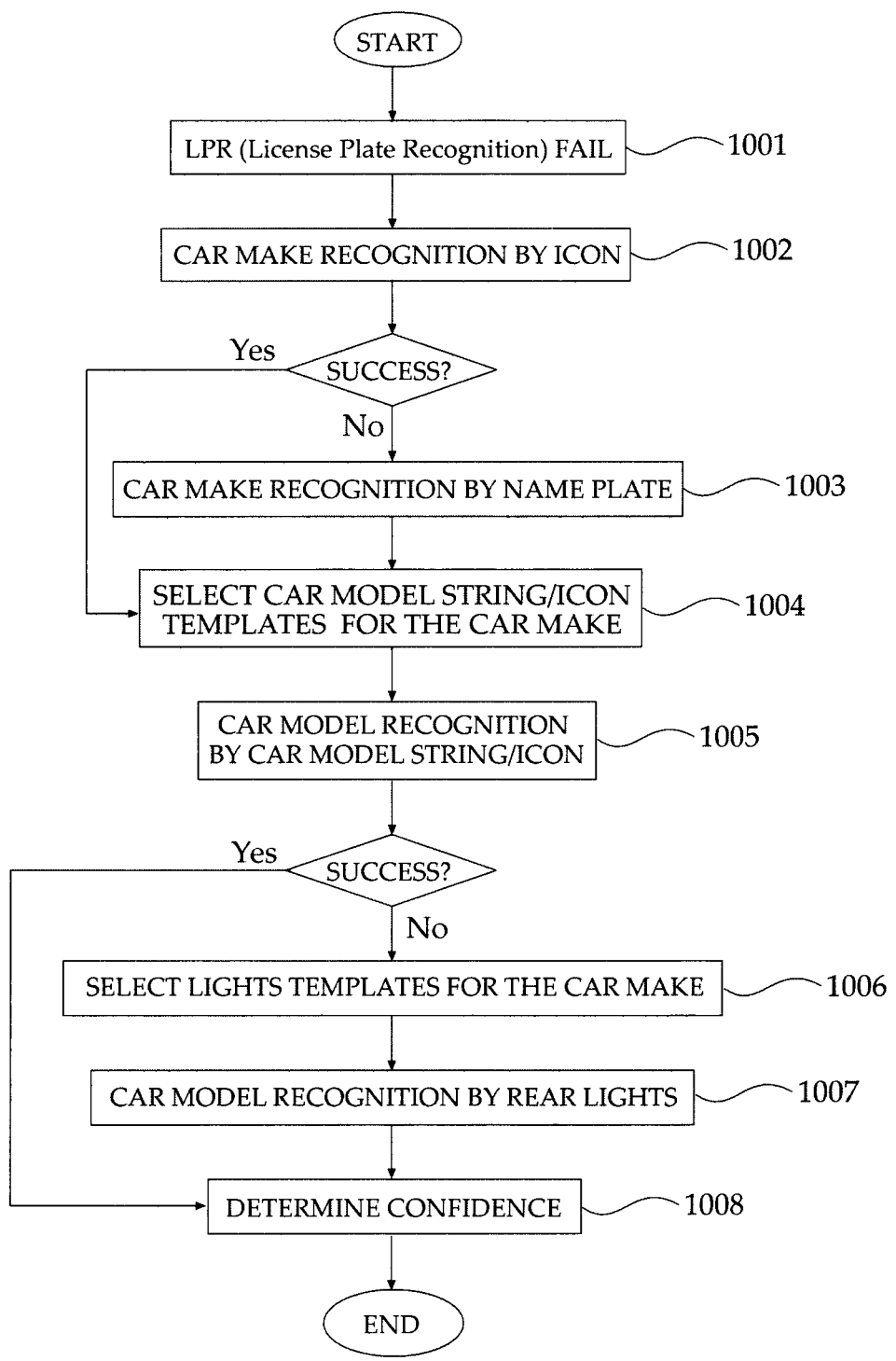
FIG. 10 is a flow chart illustrating multi-parameter processing, in accordance with certain embodiments of the invention.

FIG. 10 is a flowchart illustrating multi-parameter processing, in accordance with certain embodiments of the invention. At 1001 license plate recognition (LPR) is performed in any method known per se. Further to the LPR, the method proceeds to 1002, to attempt to recognize the car make based on a maker icon carried by the car, such as in accordance with the method illustrated with reference to FIG. 6. If 1002 fails, another trial is performed at 1003, trying to recognize the car make based on a different parameter, which in this example is the car's name plate (see, for example, 501 in FIG. 5). It can be appreciated that car make's recognition based on the car's name plate can be, according to certain embodiments, performed in a manner similar to the car maker's icon recognition, e.g., in accordance with the method illustrated in FIG. 6. It is noted that success of either 1002 or 1003 means that the car make has been recognized.

It is important to note that the part of the method presented so far is non-limiting. For example, in some embodiments car make recognition by name plate 1003 can be performed even in those cases when the car make recognition by maker icon 1002 succeeds. Alternatively, car make recognition by name plate 1003 can be done before recognition by maker icon 1003, etc.

While recognizing a car model of a known car make, it can be appreciated that the process should select from amongst the models of the known car make, instead of selecting from amongst all car models known by the system, which also includes models by other car makers. Hence, at 1004, only those templates that relate to the recognized car make are selected. According to the present embodiment, car model recognition is first tried based on car model string or icon, as illustrated by 1005. If this fails, e.g., because the car model string/icon is missing or due to any other reason, it is possible to try recognizing the car model based on the shape of the lights, and in this case, based on the shape of the rear lights, as represented by 1006 and 1007.

Car model recognition by car model string or icon, as well as by the shape of the car lights can be performed, e.g., in accordance with the method previously presented with reference to FIG. 6. In addition, it should be appreciated that in the illustrated method of FIG. 10 car make recognition based on name plate is performed only upon failure in recognizing the car make in some other way, which in this example is car make recognition by icon. However, this should not be a limitation of the invention as other embodiments may try to recognize the car make based on name plate, even in those cases when recognition based on icon has been successful. In those cases when the car make cannot be recognized, it is appreciated that recognizing the car model can also provide car make recognition. For example, if the car model recognition indicates that the model is "Corolla", it is possible to deduce that the car make is "Toyota". Yet, if car model recognition is performed without knowledge about the car make, template selection (such as in 1004 and 1006) may be given up. Further to recognizing the car model the confidence level is determined at 1008.

Further to describing several identification parameters and ways for collecting information relating thereto, it is noted that several embodiments of the present invention can identify a vehicle's body color, which is also considered as an identification parameter of the vehicle. It is noted though that vehicle's body color identification is one use of the color identification method described below, and other uses may exist, such as license plate color identification. Moreover, the method is not limited for use in car identification applications. Other fields may include, for example, identifying the color of a marine IMO label (International Maritime Organization) carrying ship identification number, etc. Hereinafter, vehicle's body color identification is brought as a non-limiting example.

Figure 11:
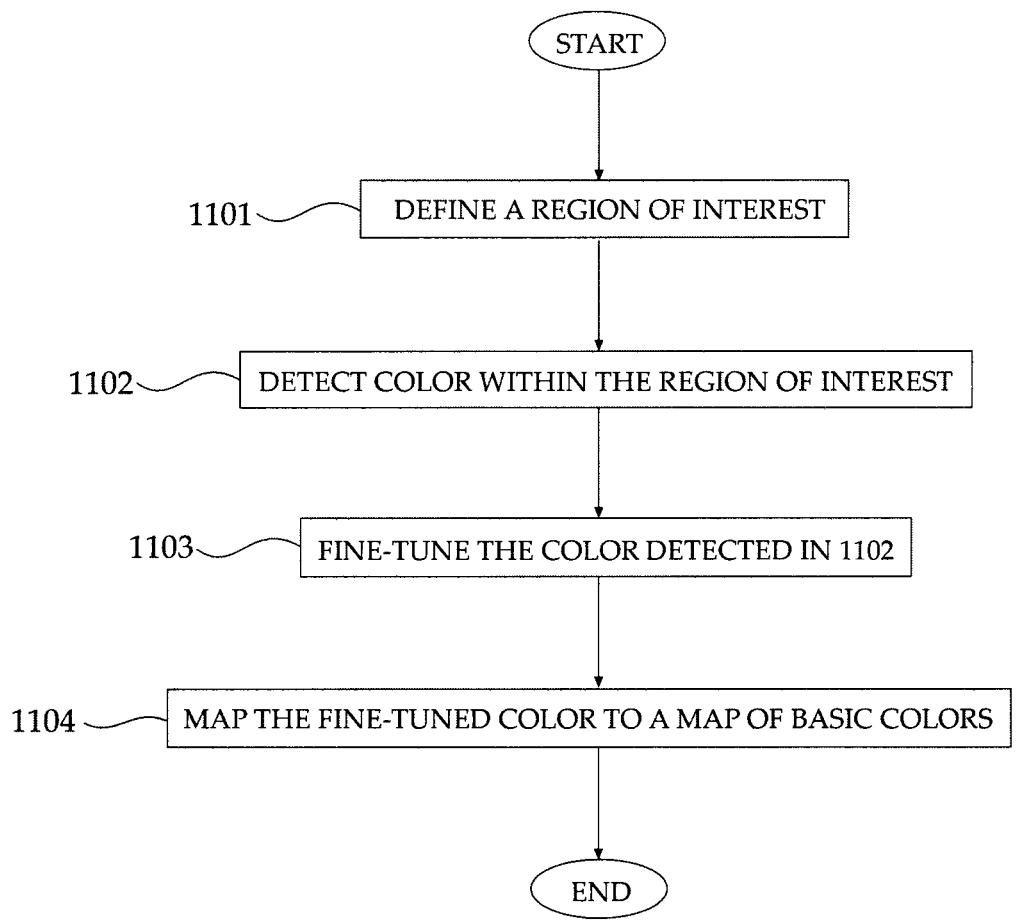
FIG. 11 is a flowchart showing the main operations performed while identifying color of a vehicle, according to certain embodiments of the invention.

FIG. 11 is a flowchart showing the main operations performed while identifying color of a vehicle, according to certain embodiments of the invention. At 1101 a Region Of Interest (ROI) is defined, while the vehicle body color in this region of interest has to be identified. At 1102 the color within the region of interest is detected, and the detected color is fine tuned at 1103. Then, at 1104 the fine-tuned color is mapped to a set of basic colors.

In order to be able to indentify color in accordance with the invention, the set of basic colors should be obtained. It is possible to obtain as input a set prepared in advance, or it is possible to construct the set in a preparatory phase of the system's operation, either during installation or during initial running stages.

According to one example, wherein the color identification method is used for car body color identification in the United States, it is possible to construct the set of basic colors based on a list of twenty six (26) vehicle color codes defined by the state and illustrated in the following Table 1. In this example the table includes several relating colors, such as bronze and copper, that may overlap and confuse the system by returning false positive response when matching a vehicle body color to a color listed in the table. Hence, while constructing the set of basic colors it is preferable to "merge" such related colors under a single code. According to one embodiment, the constructed set of basic colors includes twelve (12) colors while the number twelve is non-limiting and provided here as an example only.

| Table 1 presents a vehicle color code list valid in United States | |
|---|---|
| Code | Color |
| ALU | Aluminum |
| BEI | Beige |
| BLA | Black |
| BLU | Blue |
| BRO | Brown |
| BRZ | Bronze |
| CLA | Claret |
| COP | Copper |
| CRM | Cream |
| GOL | Gold |
| GRA | Gray |
| GRE | Green |
| MAR | Maroon |
| MTL | Metallic |
| NAV | Navy |
| ORA | Orange |
| PIN | Pink |
| PUR | Purple |
| RED | Red |
| ROS | Rose |
| RUS | Rust |
| SIL | Silver |
| TAN | Tan |
| TUR | Turquoise |
| WHI | White |
| YEL | Yellow |

It was previously explained, in the background of the invention, that different color histograms exist. The colour histograms can be used for detecting colour, e.g., in 1101, FIG. 11. Each type of histogram and the systems constructed thereon have certain limitations. For example, a drawback of Swain and Ballard's system is that the object intended for recognition has to be segmented from the background before the system can be used.

Furthermore, dealing with hue histogram, van de Weijer et al. apply error analysis to the hue. The analysis shows that the certainty of the hue is inversely proportional to the saturation. Therefore, the hue histogram is made more robust by weighing each sample of the hue by its saturation. The H and the S color models are scale invariant and shift-invariant with respect to light intensity.

In certain embodiments the HSV color space is more convenient to work with. For example, it is possible to use this color space after the normalization is done using the Transformed Color Distribution histogram method. However, the whites, grays and blacks must be treated separately since the Hue dimension does not relate to these colors.

Then, histograms need to be matched, e.g., in 1104 of FIG. 11. Histogram matching, according to different embodiments, may be done using one or more of several algorithms, such as histogram intersection or histogram peaks matching.

Figure 12:
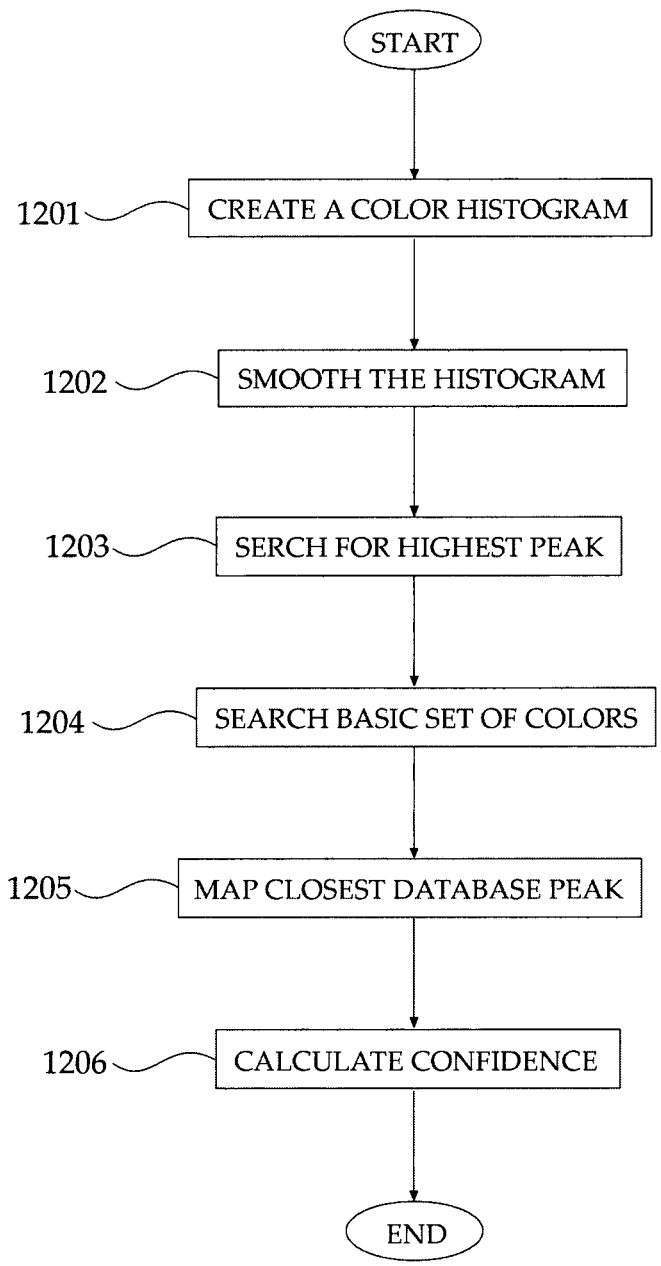
FIG. 12 is a flowchart illustrating color identification in higher details, according to certain embodiments of the invention.

FIG. 12 is a flowchart illustrating color identification in higher details, according to certain embodiments of the invention. In the presently illustrated embodiment matching is performed using histogram peaks matching:

At 1201 a colour histogram is created using any applicable method. Then, at 1202 the histogram is smoothed and at 1203 the highest peak is searched for. At 1204 the basic set of colors is searched: in HSV it is only the hue axis that is searched and in RGB searching is performed in two dimensions (R G).

Then, at 1205 the closest database peak position is mapped to a recognized color, or class, and at 1206 confidence is calculated, e.g., in accordance with $$100*[1-D(p-p1)/D(p1-p2)].$$

Wherein:
D is a distance function;
p is the found peak position;
p1 is the closest database peak position; and
p2 is the next closest data base peak position Further to understanding how embodiments of the invention can be carried out, attention reverts now to the structure of system 101 (see, e.g., FIGS. 1 and 2), and more specifically, to the analyzer 103, with reference to FIG. 13.

According to certain embodiments of the invention, the analyzer 103 may include sub-modules, allowing it to analyze an image, or images of a vehicle in order to determine information relating to identity parameters thereof. The analyzer illustrated in the figure, thus, includes a cropping module 1301, interest points detector 1302, an image processor 1303 and a matching processor 1304.

In order to understand how these sub-modules operate, the flowchart of FIG. 6 can be brought as an example. It was mentioned before that the flowchart illustrates the identification of maker-icons, however, this is only an example and the flowchart may be applicable to other identity parameters as well, with or without minor modifications. Similarly, it can be understood that as the analyzer and its sub-modules may analyze information relating to a maker icon, they may also analyze information relating to other identity parameters of a vehicle.

The cropping module 1301 is configured to identify a Region of Interest (ROI) within the image/images obtained, producing an enhanced sub-image including the ROI. Then, the interest points detector 1302, which is configured to detect and identify interest points may operate in accordance with 603, i.e., it is configured to identify interest points in the sub-image wherein the interest points relate to an identity parameter. The cropping module 1301 and the interest points detector 1302 are coupled, so that the interest points detector may obtain sub-images produced by the cropping module, while the coupling may be direct or indirect. For example, a sub-image produced by the cropping module can be stored in a storage device internal or external to the analyzer (the storage device is not shown in the figure), thereafter the interest points detector may retrieve the sub-image therefrom.

The image processor 1303 is configured to represent each of the interest points or part thereof by a descriptor, which (as was previously explained with reference to FIG. 6) is a numerical representation. The image processor may also be coupled to the interest points detector in a direct or indirect manner.

The matching processor 1304, which is directly or indirectly coupleable to the image processor 1303, is configured to compare the detectors with detectors representing interest points in another image or sub-image, e.g., in previously obtained images respective of known identity parameters, as was previously explained with reference to 604 of FIG. 6.

Figure 13:
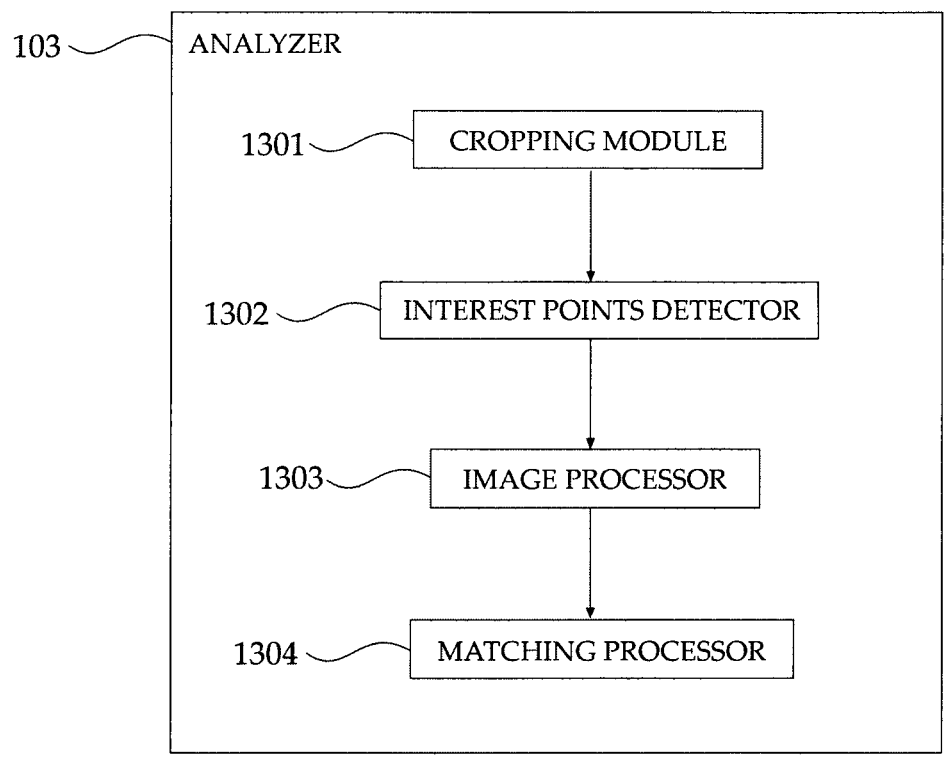
FIG. 13 schematically illustrates an analyzer, in accordance with one embodiment of the invention.
Figure 14:
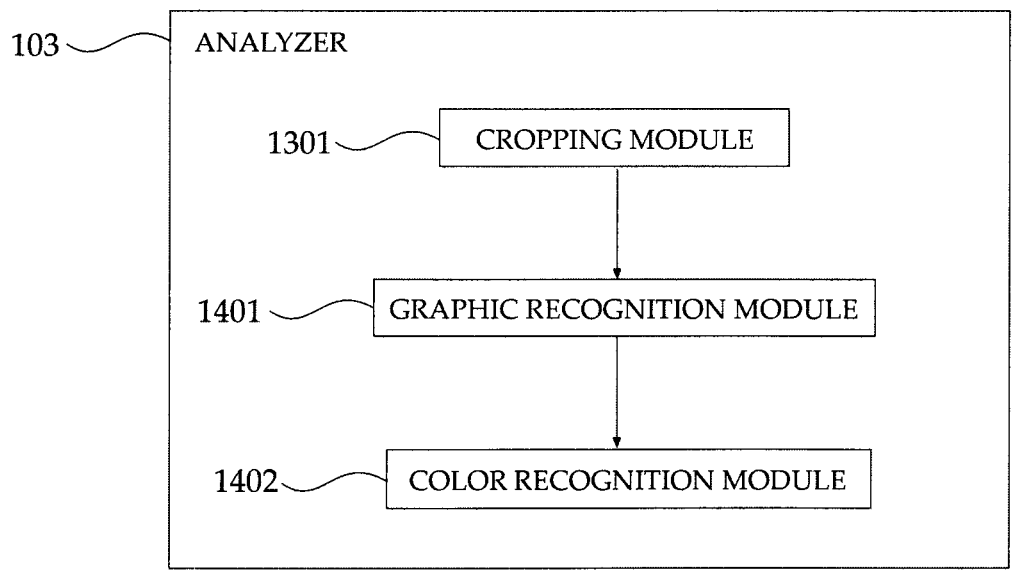
FIG. 14 schematically illustrates an analyzer adapted for analyzing information carried by a vehicle license plate, in accordance with another embodiment of the invention.

FIG. 14 schematically illustrates an analyzer adapted for analyzing information carried by a vehicle license plate, in accordance with another embodiment of the invention. Similar to the analyzer of FIG. 13, the analyzer of FIG. 14 also includes a cropping module 1301. In addition, the present analyzer includes a graphic recognition module 1401 configured, for example, to recognize non-alphanumeric data marked on a license plate, such as a disabled parking placard and other marks, or anywhere else, such as on stickers. It is noted that the recognition can be made, e.g., in a method resembling the method of FIG. 6, previously described for recognizing a car make icon. Hence, the graphic recognition module 1401 may include, according to one embodiment, interest points detector 1302, an image processor 1303 and a matching processor 1304, although they are not shown in FIG. 14.

Furthermore, the analyzer of FIG. 14 includes also a colors recognition module 1402 configured for identifying colors used for marking data on said license plate and for background of said license plate. That is, the colors recognition module 1402 can operate, e.g., in accordance with the method represented by the flowcharts of FIG. 11 or 12.

Further to understanding how the analyzers of FIGS. 13 and 14 operate, and the modules comprising them, a person versed in the art will appreciate that additional or alternative analyzers may exist, such as an analyzer that recognizes color (without graphical recognition), an analyzer that is configured to analyze textual and graphical images, and any other combination that may be applicable to the case.

The present invention has been described with a certain degree of particularity, but those versed in the art will readily appreciate that various alterations and modifications may be carried out, without departing from the scope of the following claims.

It will be understood that the system according to the invention or parts thereof may be a suitably programmed computer. Likewise, the invention contemplates a computer program being readable by a computer for executing methods of the invention. The invention further contemplates a machine-readable memory tangibly embodying a program of instructions executable by the machine for executing the methods of the invention.

The invention claimed is:

1. A computer-implemented method for identifying a vehicle, the method comprising:
  obtaining one or more images of the vehicle;
  producing at least one sub-image, the at least one sub-image comprising an area of the one or more obtained images that contains one or more identity parameters of the vehicle, the at least one sub-image being enhanced based on the one or more obtained images;
  detecting one or more interest points within the at least one sub-image, each interest point relating to at least one of the one or more identity parameters, and each interest point being substantially capable of detection as an interest point across a plurality of changing image capture conditions;
  for each distinct interest point, processing the at least one sub-image to obtain one or more descriptors, the one or more descriptors comprising a corresponding numeric representation of the distinct interest point;
  matching, with one or more processors, one or more of the descriptors to one or more templates, each template corresponding to at least one of (a) a known vehicle manufacturer and (b) a known vehicle make and each template comprising one or more predetermined descriptors representing interest points in previously obtained images that correspond to known identity parameters;
  calculating a confidence measure of a match between one or more of the descriptors and one or more of the templates; and
  identifying one or more identity parameters of the vehicle based on at least one match and at least one confidence measure.

2. The method of claim 1, wherein producing the at least one sub-image comprises identifying a Region of Interest (ROI) within the one or more images where an identity parameter requiring identification appears.

3. The method of claim 1, wherein the at least one sub-image comprises a partial area of the one or more images.

4. The method of claim 1, further comprising:
  obtaining at least one image of a license plate of the vehicle;
  analyzing said at least one image of the license plate to obtain a registration string appearing on the license plate;
  recognizing non-alphanumeric data marked on the license plate; and
  identifying colors used for marking data on the license plate and for background of the license plate, the colors forming part of the license plate information.

5. The method of claim 1, wherein the one or more images of the vehicle comprise a plurality of images, wherein the producing step comprises producing at least one sub-image for each of the plurality of images, wherein the detecting step comprises detecting one or more interest points within each of the at least one sub-images, the method further comprising:
  selecting one or more common interest points from among the detected interest points, the one or more common interest points being commonly present in more than one of the sub-images;
  wherein the matching step further comprises searching for the one or more common interest points within the one or more templates and selecting at least one template based on an identification of the one or more common interest points within the at least one template.

6. The method of claim 5, wherein the calculating step comprises calculating the confidence measure based on the one or more common interest points.

7. The method of claim 5, wherein the calculating step comprises calculating the confidence measure based on a number of repeating interest points in at least one of (a) a single image and (b) a single sub-image.

8. The method of claim 1, wherein the one or more interest points comprise one or more one or more points located at least one of (a) within a maker icon of the vehicle, and (b) adjacent to the maker icon of the vehicle.

9. The method of claim 8, wherein the one or more interest points represent corners of the maker icon.

10. The method of claim 8, wherein the one or more interest points represent changes in brightness in both horizontal and vertical directions.

11. The method of claim 1, wherein at least one of the one or more templates comprises a vector of descriptors, the vector of descriptors representing an interest point.

12. The method of claim 1, wherein the vector of descriptors represents a neighborhood of the interest point.

13. The method of claim 1, wherein at least one of the one or more identity parameters of the vehicle comprises at least one of:
- a maker icon of the vehicle,
- a grille shape of the vehicle,
- a head lights shape of the vehicle,
- a tail lights shape of the vehicle,
- a model icon of the vehicle,
- a body color of the vehicle,
- a vehicle make of the vehicle,
- a vehicle model of the vehicle,
- a lights shape of the vehicle,
- a license plate characteristic of the vehicle,
- a sticker of the vehicle, and
- an emblem of the vehicle.

14. The method of claim 1, further comprising selecting the one or more templates from among templates that relate to the make of the vehicle.

15. The method of claim 14, wherein the selecting step is responsive to a failure of a license plate recognition process.

16. The method of claim 14, wherein the selecting step is responsive to a failure of a vehicle icon recognition process.

17. A system for identifying a vehicle, the system comprising one or more processors configured to interact with a computer-readable medium in order to perform operations comprising:
- obtaining one or more images of the vehicle;
- producing at least one sub-image, the at least one sub-image comprising an area of the one or more obtained images that contains one or more identity parameters of the vehicle, the at least one sub-image being enhanced based on the one or more obtained images;
- detecting one or more interest points within the at least one sub-image, each interest point relating to at least one of the one or more identity parameters, and each interest point being substantially capable of detection as an interest point across a plurality of changing image capture conditions;
- for each distinct interest point, processing the at least one sub-image to obtain one or more descriptors, the one or more descriptors comprising a corresponding numeric representation of the distinct interest point;
- matching, with one or more processors, one or more of the descriptors to one or more templates, each template corresponding to at least one of (a) a known vehicle manufacturer and (b) a known vehicle make and each template comprising one or more predetermined descriptors representing interest points in previously obtained images that correspond to known identity parameters;
- calculating a confidence measure of a match between one or more of the descriptors and one or more of the templates; and
- identifying one or more identity parameters of the vehicle based on at least one match and at least one confidence measure.

18. The system of claim 17, further configured to perform operations comprising:
- obtaining at least one image of a license plate of the vehicle;
- analyzing said at least one image of the license plate to obtain a registration string appearing on the license plate;
- recognizing non-alphanumeric data marked on the license plate; and
- identifying colors used for marking data on the license plate and for background of the license plate, the colors forming part of the license plate information.

19. A non-transitory computer storage medium encoded with a computer program, the program comprising instructions that when executed by a data processing apparatus cause the data processing apparatus to perform operations comprising:
- obtaining one or more images of the vehicle;
- producing at least one sub-image, the at least one sub-image comprising an area of the one or more obtained images that contains one or more identity parameters of the vehicle, the at least one sub-image being enhanced based on the one or more obtained images;
- detecting one or more interest points within the at least one sub-image, each interest point relating to at least one of the one or more identity parameters, and each interest point being substantially capable of detection as an interest point across a plurality of changing image capture conditions;
- for each distinct interest point, processing the at least one sub-image to obtain one or more descriptors, the one or more descriptors comprising a corresponding numeric representation of the distinct interest point;
- matching, with one or more processors, one or more of the descriptors to one or more templates, each template corresponding to at least one of (a) a known vehicle manufacturer and (b) a known vehicle make and each template comprising one or more predetermined descriptors representing interest points in previously obtained images that correspond to known identity parameters;
- calculating a confidence measure of a match between one or more of the descriptors and one or more of the templates; and
- identifying one or more identity parameters of the vehicle based on at least one match and at least one confidence measure.

20. The non-transitory computer storage medium of claim 19, further encoded with a computer program that comprises instructions that when executed by a data processing apparatus cause the data processing apparatus to perform operations comprising:
- obtaining at least one image of a license plate of the vehicle;
- analyzing said at least one image of the license plate to obtain a registration string appearing on the license plate;
- recognizing non-alphanumeric data marked on the license plate; and
- identifying colors used for marking data on the license plate and for background of the license plate, the colors forming part of the license plate information.

* * * * *